United States Patent [19]

Deguchi et al.

[11] Patent Number: 4,721,368
[45] Date of Patent: Jan. 26, 1988

[54] OPTICAL SYSTEM IN A MAGNETO-OPTICAL MEMORY DEVICE

[75] Inventors: Toshihisa Deguchi; Tetsuya Inui; Yoshikazu Fujii, all of Nara; Hideyoshi Yamaoka, Matsubara, all of Japan

[73] Assignee: Sharp Kabushiki Kaisha, Osaka, Japan

[21] Appl. No.: 668,796

[22] Filed: Nov. 6, 1984

[30] Foreign Application Priority Data

Nov. 8, 1983 [JP] Japan ................................. 58-210370

[51] Int. Cl.⁴ .................................................. G02B 5/30
[52] U.S. Cl. ............................................ 350/377; 369/110
[58] Field of Search ............................. 350/375–377, 350/400–403; 365/122; 369/110

[56] References Cited

U.S. PATENT DOCUMENTS

| 4,337,535 | 6/1982 | Van Megan et al. | 369/110 |
| 4,409,631 | 10/1983 | Matsumoto | 369/110 |
| 4,507,766 | 3/1985 | Saimi et al. | 369/110 |
| 4,516,837 | 5/1985 | Soref et al. | 350/400 |

Primary Examiner—Bruce Y. Arnold
Attorney, Agent, or Firm—Birch, Stewart, Kolasch & Birch

[57] ABSTRACT

A magneto-optical memory device includes a recording medium having a magnetic anisotropy in a direction perpendicular to the main surface thereof. A semiconductor laser is employed in an optical system of the magneto-optical memory device for reproduction purposes. A polarization beam splitter is disposed in the optical system. A multi coated dielectric thin-film is deposited on the reflection surface of the polarization beam splitter in order to establish a desired relationship between the reflection of the P-polarization component and the S-polarization component.

10 Claims, 8 Drawing Figures

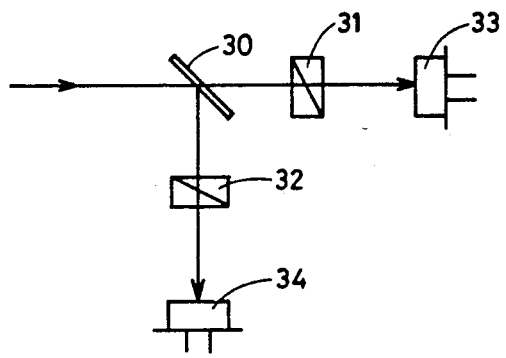
FIG. 5 PRIOR ART
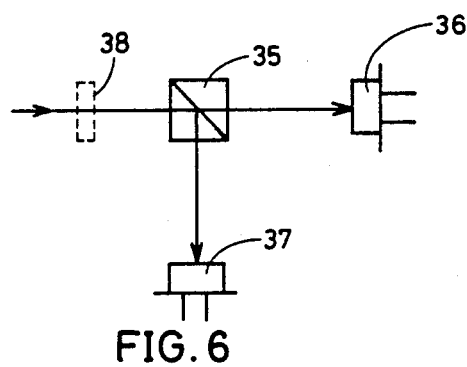
FIG. 6
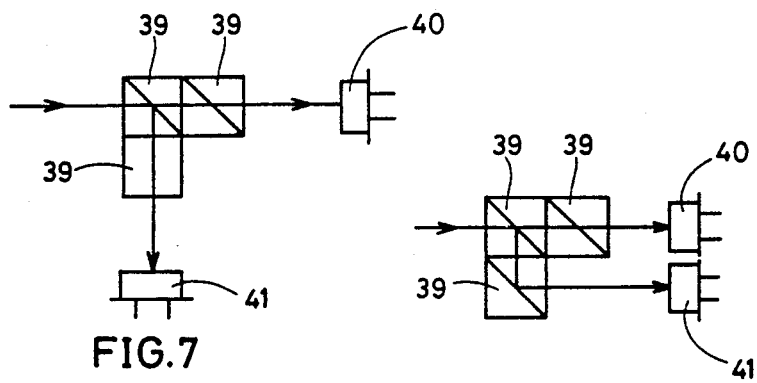
FIG. 7
FIG. 8

OPTICAL SYSTEM IN A MAGNETO-OPTICAL MEMORY DEVICE

BACKGROUND OF THE INVENTION

1. Field of the Invention

The present invention relates to a magneto-optical memory device, wherein information is recorded into, read out from, or erased from a recording medium by applying a laser beam onto the recording medium having a magnetic thin-film recording layer. The present invention relates, more particularly, to an optical system in a magneto-optical memory device.

2. Description of the Prior Art

Recently, an optical memory system has been developed, which ensures high density storage, large storage capacity, and high speed accessing. In particular, an optical memory system is provided wherein a row of fine pits are formed in a recording medium and the diffraction effect of the light beam at the pit portions is used for reproduction purposes, or another optical memory system wherein bit shaped areas having a different refractive index are formed in a recording medium and the variation of the refractive index or transparency is used for reproduction purposes and has practical application. However, the optical memory system can only perform the reproduction operation, or perform add-on recording at best. That is, the conventional optical memory system can not perform the erase operation which is one of the most remarkable features of the present memory system.

A magneto-optical memory system has been developed, which includes a recording medium made of magnetic material. The magneto-optical memory system is very effective because the recording/erasing operation is easily conducted in the magneto-optical memory system. However, the conventional magneto-optical memory system can not ensure the high quality of the reproduced signal, and the optical system thereof is complicated.

OBJECTS AND SUMMARY OF THE INVENTION

Objects of the Invention

Accordingly, an object of the present invention is to enhance the quality of a reproduced signal in a magneto-optical memory system.

Another object of the present invention is to properly control the optical characteristics of an optical system including a beam splitter, a mirror and an analyzer in a magneto-optical memory device.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Summary of the Invention

To achieve the above objects, pursuant to an embodiment of the present invention, a multi-coat dielectric layer is formed on a reflection surface of a beam splitter disposed in an optical system so that a desired relationship is established between the reflection of the P-polarized component and the reflection of the S-polarized component. In a preferred form, the magneto-optic rotation angle caused by a recording layer is also taken into consideration to determine the reflection of the multi-coat dielectric layer deposited on the reflection surface of the beam splitter.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 5 is a schematic diagram of a differential reproduction optical system of the prior art;

FIG. 6 is a schematic diagram of an embodiment of a differential reproduction optical system which may be included in the magneto-optical memory device of FIG. 1;

FIG. 7 is a schematic diagram of another embodiment of a differential reproduction optical system which may be included in the magneto-optical memory device of FIG. 1; and FIG. 8 is a schematic diagram of still another embodiment of a differential reproduction optical system which may be included in the magneto-optical memory device of FIG. 1.

DESCRIPTION OF THE PREFERRED EMBODIMENTS

Figure 1:
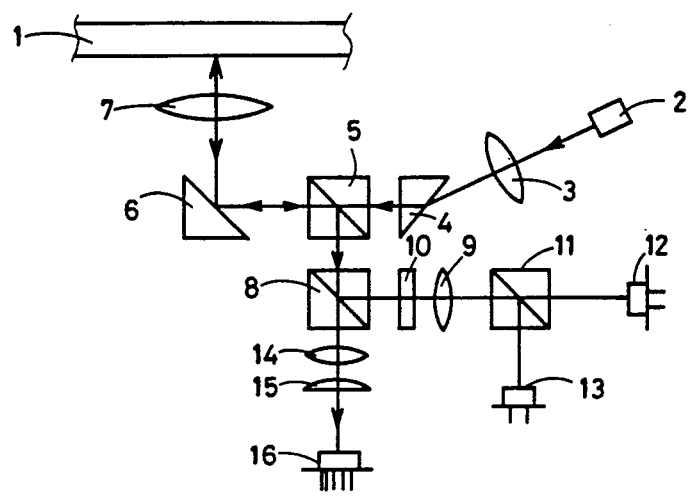
FIG. 1 is a schematic view of an embodiment of an optical system of a magneto-optical memory device of the present invention.

A magnetic recording medium 1 includes an amorphous alloy thin-film recording layer, having a magnetic anisotropy in a direction perpendicular to the major surface thereof, and is made of an alloy of rare earth metal and transition metal. An embodiment of an optical system of a magneto-optical memory device of the present invention includes a semiconductor laser 2 emitting the laser beam at a predetermined intensity. The laser beam emitted from the semiconductor laser 2 is converted into a parallel beam by a collimator lens 3, and is introduced into a prism 4 which functions to convert the ellipse laser beam into the approximately circular laser beam. The beam introducing surface of the prism 4 is coated with a film which minimizes the reflection of the P-polarized beam. A polarization beam splitter 5 is disposed in the optical system so as to apply the reproduced beam reflected from the recording medium 1 to a detection system. The polarization beam splitter 5 functions to improve the polarization of the transmitting beam by further rotating the polarization direction of the reflecting beam, thereby increasing the apparent magneto-optic rotation angle. Functions of the polarization beam splitter 5 will be described later in detail.

A total deflection prism 6 is disposed in the optical system so as to change the optical path by 90°. The slant face of the total reflection prism 6 is coated with a multi-layered dielectric film which maintains the phase shift between the S-wave and the P-wave at $n\pi$. That is, the total reflection prism 6 changes the optical path by 90° without changing the polarized condition of the introduced beam. An objective lens 7 functions to provide a fine spot on the recording medium 1. Another polarization beam splitter 8 is provided so as to introduce the reproduced beam from the polarization beam splitter 5. The polarization beam splitters 8 also functions to increase the magneto-optic rotation angle of the reflecting beam. The reproduced beam reflected at the polarization beam splitter 8 is introduced into a lens 9 via a half-wave plate 10. The lens 9 functions to apply the reproduced beam to a direction system at a desired beam size. The half-wave plate 10 functions to rotate the polarization direction of the reproduced beam in a desired direction. A polarization beam splitter 11 separates the S-polarization and the P-polarization. The detected, reproduced beam is applied to light responsive elements or photosensors 12 and 13, respectively. Each of the light responsive elements 12 and 13 is preferably made of a Si PIN photodiode, or a Si APD (Avalanche Photo Doide). The optical system further includes a lens 14, and a cylindrical lens 15. The cylindrical lens 15 has a focal line which is inclined by 45° with respect to the tangent direction of the track formed on the recording medium 1. A complex detection unit 16 is provided so as to detect the variation of the relative distance between the recording medium 1 and the objective lens 7 through the use of the synergistic effects of the lens 14 and the cylindrical lens 15. The complex detection unit 16 further detects the displacement of the beam spot from the information track, namely the tracking information.

Now assume that the polarization beam splitters 5 and 8 have the reflectance $r_P$ for the P-polarization, and the reflectance $r_S$ for the S-polarization of:

$(r_P)^2=0.2$ and $(r_S)^2=0.9$ (type I)
$(r_P)^2=0.3$ and $(r_S)^2=0.99$ (type II) or
$(r_P)^2=0.4$ and $(r_S)^2=0.997$ (type III)

The reflectance $r_P$ should be small so as to ensure the desirable increase of the magneto-optic rotation angle. The increase of the magneto-optic rotation angle produced by the polarization beam splitter of the type I, II and III is, results in an increasing ratio, about 2.1, about 1.8 and about 1.6, respectively for each type polarizing beam splitter. Desired polarization beam splitters 5 and 8 should be selected with reference to the transmitting light intensity and the reflecting light intensity. In a preferred form, the polarization beam splitter 5 should have a high transmissivity in order to reduce the laser power in the writing operation. However, the transmissivity of the polarization beam splitter 5 should not be extremely high because the reproduced signal should be transferred to the detection unit via the polarization beam splitter 5. Thus, the $(r_P)^2$ of the polarization beam splitter 5 should be selected between 0.1 and 0.5. On the other hand, the $(r_P)^2$ of the polarization beam splitter 8 is preferably between 0.05 and 0.5 when the light responsive elements 12 and 13 are an Avalanche Photo Diode (APD). This is to ensure that the reproduced signal has a high quality when the signal modulation factor is high.

Figure 2:
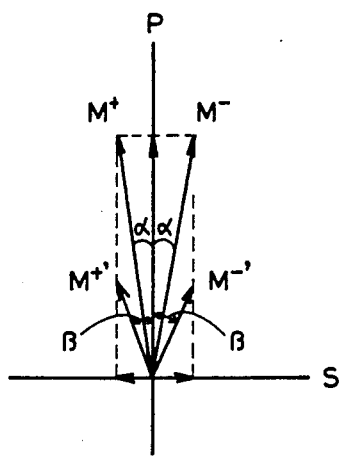
FIG. 2 is a vector diagram showing the polarization condition of a reproduced beam obtained in the magneto-optical memory device of FIG. 1.

FIG. 2 is a vector diagram showing the optical characteristics of the polarization beam splitters 5 and 8. The optical system is arranged in a manner such that the laser beam emitted from the semiconductor laser 2 is of the P-polarization beam with respect to the polarization beam splitter 5. The laser beam reaching the recording medium 1 maintains the polarized condition, and (for unit energy input) has the energy of $(1-(r_P)^2)$. The laser beam reflected at the recording medium 1 and introduced again into the polarization beam splitter 5 has a plane of polarization which is slightly rotated in the clockwise direction or in the counter-clockwise direction by the Kerr rotation angle $\alpha$ in accordance with the magnetized condition (upward or downward) of the recording medium 1. When the plane of polarization of the thus introduced beam is represented as M+ and M−, respectively, the laser beam developed from the polarization beam splitter 5 and directed to the detection unit has the polarization M+' and M−', respectively. When the reproduced laser beam is reflected at the polarization beam splitter 5, the beam energy decreases, but the rotation angle $\beta$ of the plane of polarization becomes as follows in accordance with the reflection characteristics of the polarization beam splitter 5.

$$\beta = \mathrm{Tan}^{-1}\left(\frac{r_S}{r_P}\tan\alpha\right)$$

That is, the apparent magneto-optic rotation angle is increased. The above-mentioned increase ratio of the rotation angle is ensured only when the phase shift between the S-wave and the P-wave reflected from the polarization beam splitter is $n\pi$. If the phase shift is deviated from $n\pi$, the increase ratio becomes small, and the ellipse ratio becomes large. The signal modulation factor becomes small, and the S/N ratio deteriorates.

Figure 3:
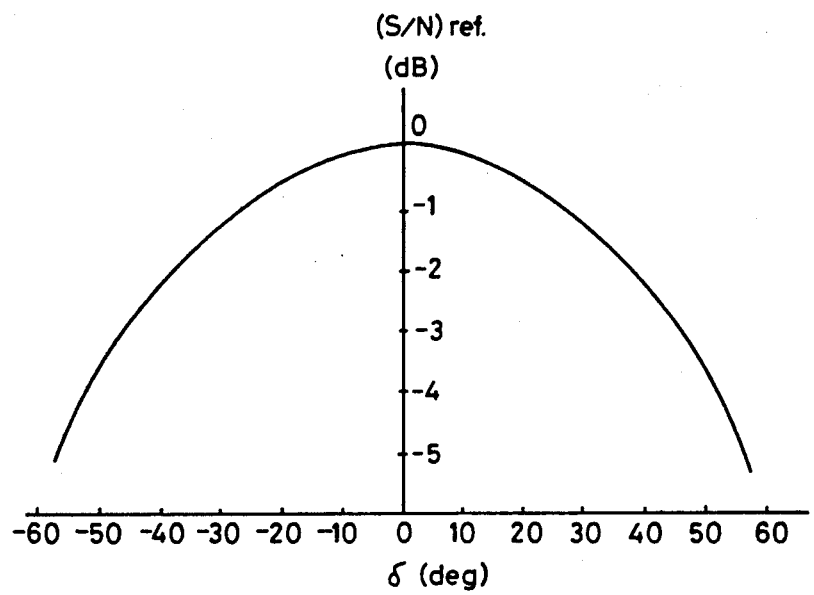
FIG. 3 is a graph showing the relationship between the S/N ratio and the phase shift $\delta$ in the magneto-optical memory device of FIG. 1.
Figure 4:
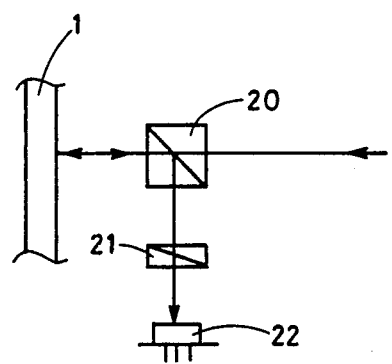
FIG. 4 is a schematic side view of a reproduction section included in the magneto-optical memory device of FIG. 1.

FIG. 3 shows a calculated S/N ratio depending on the phase shift $\delta$ when the polarized beam is applied to an optical system of FIG. 4.

A polarization beam splitter 20 has the following characteristics.

$r_P=0.3$, $r_S\approx1.0$ (reflection)
$T_P=0.7$, $T_S\approx0$ (transmission)

The optical system of FIG. 4 includes the polarization beam splitter 20, an analyzer 21, and a light detecting element 22. It will be clear from FIG. 3 that the phase shift $\delta$ between the P-wave and S-wave reflected at the polarization beam splitter 20 must be held in the following condition in order to obtain a sufficient S/N ratio.

$n\pi-(\pi/4)\leq\delta\leq n\pi+(\pi/4)$ (n: integer)

The calculation result of FIG. 3 is a relative S/N ratio when the direction of the analyzer 21 is set to ensure the maximum S/N ratio. A similar S/N ratio is obtained when the direction of the analyzer 21 is set at the middle (45°) of the S-direction and the P-direction. The S/N ratio further deteriorates when the extinction ratio of the optical system deteriorates. That is, the phase shift $\delta$ of the polarization beam splitter must be strictly controlled. Moreover, the phase shift $\delta$ must be properly controlled not only at the polarization beam splitters 5 and 8 but also at the remaining optical components such as the total reflection prism 6.

As already discussed above, by employing the polarization beam splitters 5 and 8 in a manner described above, the magneto-optic rotation angle is increased, and the reproduction operation is effectively conducted. Since the rotation angle is increased, the azimuth of the analyzer can be selected at a large value. Accordingly, the S/N ratio is hardly influenced by the extinction ratio of the optical components. That is, a desirable reproduction is carried out.

However, it is impossible to enhance the S/N ratio determined by the recording medium 1 through the use of the polarization beam splitters 5 and 8. That is, the main purpose of the polarization beam splitters 5 and 8 is to minimize the deterioration of the information beam reflected from the recording medium 1. When the detection unit includes an element having the amplifying function such as a photomultiplier or an APD (Avalanche Photo Diode), the main noise source is the optical shot noise. The S/N ratio can be represented as follows.

$$S/N \alpha \sqrt{P} \cdot \theta$$

(P: light intensity to be analyzed)
($\theta$: magneto-optic rotation angle)

Accordingly, the optical characteristics $r_P$ and $r_S$ must satisfy the following condition in order to minimize the deterioration of the S/N ratio when the beam has the magneto-optic rotation angle $\theta_0$ before it is introduced into the polarization beam splitter.

$$\frac{\sqrt{P}\ [(r_P\cos\theta_0)^2 + (r_S\sin\theta_0)^2]^{\frac{1}{2}} \cdot \left[\mathrm{Tan}^{-1}\left(\frac{r_S}{r_P}\tan\theta_0\right)\right]}{\sqrt{P} \cdot \theta_0} \approx 1$$

That is, the optical characteristics should be selected such that the product of the light intensity and the magneto-optic rotation angle after the beam is developed from the polarization beam splitter approximates to that before the beam is introduced into the polarization beam splitter.

FIG. 5 shows a conventional optical head which utilizes the differential reproduction method. The conventional system includes a half mirror 30, and analyzers 31 and 32. The analyzers 31 and 32 totally reflect the S-polarization, and totally transmit the P-polarization. Light responsive elements 33 and 34 are disposed to detect the reproduced beam. In the conventional optical system, the information beams divided by the half mirror 30 are detected, respectively, and differentially reproduced. The polarization condition of the information beam divided by the half mirror is not determinative.

FIG. 6 shows an optical system related to the present invention. An analyzer 35 (polarization beam splitter) is employed to form the differential optical system. Light responsive elements 36 and 37 are disposed to detect the beam developed from the analyzer 35. The difference of the modulation factor is not observed when the azimuth of the analyzer 35 is selected at 45°. However, the signal modulation factor is relatively small and, thus, the S/N ratio is not so high in a specific case when the azimuth of the analyzer is selected at a large value. The modulation factor should be improved by employing the above-discussed polarization beam splitters 5 and 8, and increasing the magneto-optic rotation angle of the information beam applied to the analyzer 35. The neutral polarization direction of the information beam is adjusted at the middle (45°) of the S-axis and the P-axis of the analyzer by rotating the analyzer 35 (polarization beam splitter) by 45° when it is installed in the optical system. Alternatively, a half-wave plate 38 is disposed in front of the analyzer 35 so as to render the fast axis (slow axis) suitable for rotating the plane of polarization in a desired direction.

There is a possiblity that the extinction ratio is not sufficient when the polarization beam splitter (PBS) which is widely used in the isolator optical element of the digital audio disc (DAD) and the video disc is used as the analyzer. In this case, a plurality of polarization beam splitters 39 are coupled to form an analyzer as shown in FIGS. 7 and 8. Light respective elements 40 and 41 are disposed to detect the beam applied from the analyzer.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An optical system for use with a magneto-optical memory device having a recording medium of a magnetic thin-film with a magnetic anisotropy in a direction perpendicular to the main surface thereof, said optical system being for further use with a laser for reproduction purposes, said optical system comprising:
   a beam splitter disposed in an optical path of said optical system; and
   a multi-coated, dielectric, thin-film deposited on a reflection surface of said beam splitter, said multi-coated, dielectric, thin-film exhibiting an optical characteristic which satisfies the condition:

$$n\pi - (\pi/4) \leq \delta \leq n\pi + (\pi/4)$$

where n is an integer and $\delta$ is the phase shift between the P-wave and the S-wave which are reflected or transmitted from said beam splitter.

2. The optical system of claim 1, wherein said multi-coated, dielectric, thin-film exhibits an optical characteristic which satisfies the condition:
   $r_S > r_P$
where, $r_P$ is the reflectance of the P-polarization, and $r_S$ is the reflectance of the S-polarization.

3. The optical system of claim 2, wherein said multi-coated, dielectric, thin-film exhibits an optical characteristic which satisfies the condition:

$$[(r_P\cos\theta)^2 + (r_S\sin\theta)^2]^{\frac{1}{2}} \cdot \left[\mathrm{Tan}^{-1}\left(\frac{r_S}{r_P}\tan\theta\right)\right] / \theta \approx 1$$

where, $\theta$ is the magneto-optic rotation angle caused by said recording medium.

4. An optical system for use with a magneto-optical memory device having a recording medium comprising a magnetic thin-film having a magnetic anisotropy in a direction perpendicular to the main surface thereof, said medium selectively rotating, upon reflection, the plane of polarization of linearly polarized light incident thereon, said optical system being for further use with a laser for reproduction purposes, said optical system comprising:
   a polarization beam splitter disposed in a reproduction optical path of said optical system, said polarization beam splitter substantially totally reflecting the S-polarization of said light reflected from said magnetic thin-film, and substantially primarily transmitting the P-polarization of said light reflected from said magnetic thin-film;

a first light responsive photosensor element receiving the beam transmitted from said polarization beam splitter; and a second light responsive photosensor element receiving the beam reflected at said polarization beam splitter.

5. The optical system of claim 4, further comprising a half-wave plate disposed between said recording medium and said polarization beam splitter, the fast axis or slow axis of said half-wave plate being set to meet a condition wherein the plane of polarization of the reproduced beam is at an angle halfway between the P-axis and the S-axis of said polarization beam splitter.

6. The optical system of claim 4, wherein said polarization beam splitter is positioned with respect to an optical axis of said reproduction optical path so that the plane of polarization of the reproduced beam is positioned at at an angle halfway between the P-axis and the S-axis of said polarization beam splitter.

7. An optical system for use with a magneto-optical memory device including a recording medium reflecting and selectively rotating the plane light waves impinging thereon, comprising:

source means for developing source light linearly polarized in a first direction;

a polarization beam splitter disposed in the path of said source light and transmitting a substantial portion of said source light therethrough;

means, positioned between said memory device and said polarization beam splitter, for directing said source light to said memory device and for directing reflected information bearing light toward said polarization beam splitter, said reflected information bearing light having information contained within a data component thereof, said data component being contained in light having a second plane of polarization perpendicular to said first direction, and having a second component having a plane of polarization in said first direction;

said polarization beam splitter reflecting a substantially greater amount of said data component than said second component of said reflected information bearing light;

means, disposed in the path of said reflected information bearing light reflected from said polarization beam splitter, for separating said data component from said second component;

means, disposed in the path of said second component, for developing focusing and tracking information therefrom; and means, disposed in the path of said data component, for deriving said information from said data component of said information bearing light.

8. The system of claim 7 wherein said means for separating is a second polarization beam splitter.

9. The system of claim 8 wherein each of said polarization beam splitters is configured to significantly improve the apparent rotation angle of said reflected data component to enhance the rotation caused by said memory device.

10. The system of claim 7 wherein said polarization beam splitter is configured to significantly improve the apparent rotation angle of said reflected wave to enhance the rotation caused by said optical memory device.

* * * * *